(12) United States Patent
Tuzel et al.

(10) Patent No.: US 8,296,248 B2
(45) Date of Patent: Oct. 23, 2012

(54) METHOD FOR CLUSTERING SAMPLES WITH WEAKLY SUPERVISED KERNEL MEAN SHIFT MATRICES

(75) Inventors: Cuneyt Oncel Tuzel, Cambridge, MA (US); Fatih Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 640 days.

(21) Appl. No.: 12/495,614

(22) Filed: Jun. 30, 2009

(65) Prior Publication Data

US 2010/0332425 A1   Dec. 30, 2010

(51) Int. Cl.
*G06F 15/18* (2006.01)

(52) U.S. Cl. .......................................................... 706/12

(58) Field of Classification Search .................... 706/12
See application file for complete search history.

(56) References Cited

U.S. PATENT DOCUMENTS 7,412,429 B1 * 8/2008 Syeda-Mahmood et al. ... 706/45

* cited by examiner

*Primary Examiner* — Jeffrey A Gaffin
*Assistant Examiner* — Ola Olude-Afolabi
(74) *Attorney, Agent, or Firm* — Dirk Brinkman; Gene Vinokur

(57) ABSTRACT

A method clusters samples using a mean shift procedure. A kernel matrix is determined from the samples in a first dimension. A constraint matrix and a scaling matrix are determined from a constraint set. The kernel matrix is projected to a feature space having a second dimension using the constraint matrix, wherein the second dimension is higher than the first dimension. Then, the samples are clustered according to the kernel matrix.

14 Claims, 10 Drawing Sheets

METHOD FOR CLUSTERING SAMPLES WITH WEAKLY SUPERVISED KERNEL MEAN SHIFT MATRICES

FIELD OF THE INVENTION

This invention generally relates to mean shift clustering, and more particularly to weakly supervised kernel mean shift clustering of samples.

BACKGROUND OF THE INVENTION

Mean shift is an iterative procedure for locating stationary points of a density function derived from a set of samples. Although the mean shift procedure has been known for decades, it has only recently has been applied to computer vision applications, such as object tracking, image smoothing and foreground segmentation.

Mean shift clustering is an unsupervised density based nonparametric clustering technique for samples having an unknown distribution approximated by kernel density estimation. The cluster centers are located by the mean shift procedure, and the samples associated with the same local maxima of the density function cluster the samples. If label information is available, then the clustering accuracy can be improved significantly.

Weakly supervised clustering procedures can use pairwise "must-link" constraints to specify that two samples belong to the same cluster. Constraints of this form are natural in the context of graph partitioning, where edges in the graph encode pairwise relationships, such as in graph cuts and random walk segmentation.

Similarly, "cannot-link" constraints specify that two samples belong to different clusters. Hard constraints indicate that the constraints must be satisfied during clustering, whereas soft constraints are not necessarily satisfied but used as guide during clustering.

Unlike weakly supervised variants of k-means, spectral, and graph clustering methods, conventional mean shift methods do not utilize the label information to guide the clustering.

SUMMARY OF THE INVENTION

Mean shift clustering does not require prior knowledge of the number of clusters, and does not constrain a shape of the clusters. Instead, the clusters are based on an underlying probability distribution of samples, which is defined in advance using a distance metric. In many applications, the distance metric fails to resolve ambiguities in the clustering.

Embodiments of the invention provide a weakly supervised kernel mean shift procedure where the inherent structure of the samples is determined from constraints that specify pairs of samples that must be in the same cluster or different clusters.

The samples are implicitly projected to a higher dimension by a kernel function where the constraints can be effectively enforced during the clustering.

DETAILED DESCRIPTION OF THE PREFERRED EMBODIMENT

Overview

Figure 1:
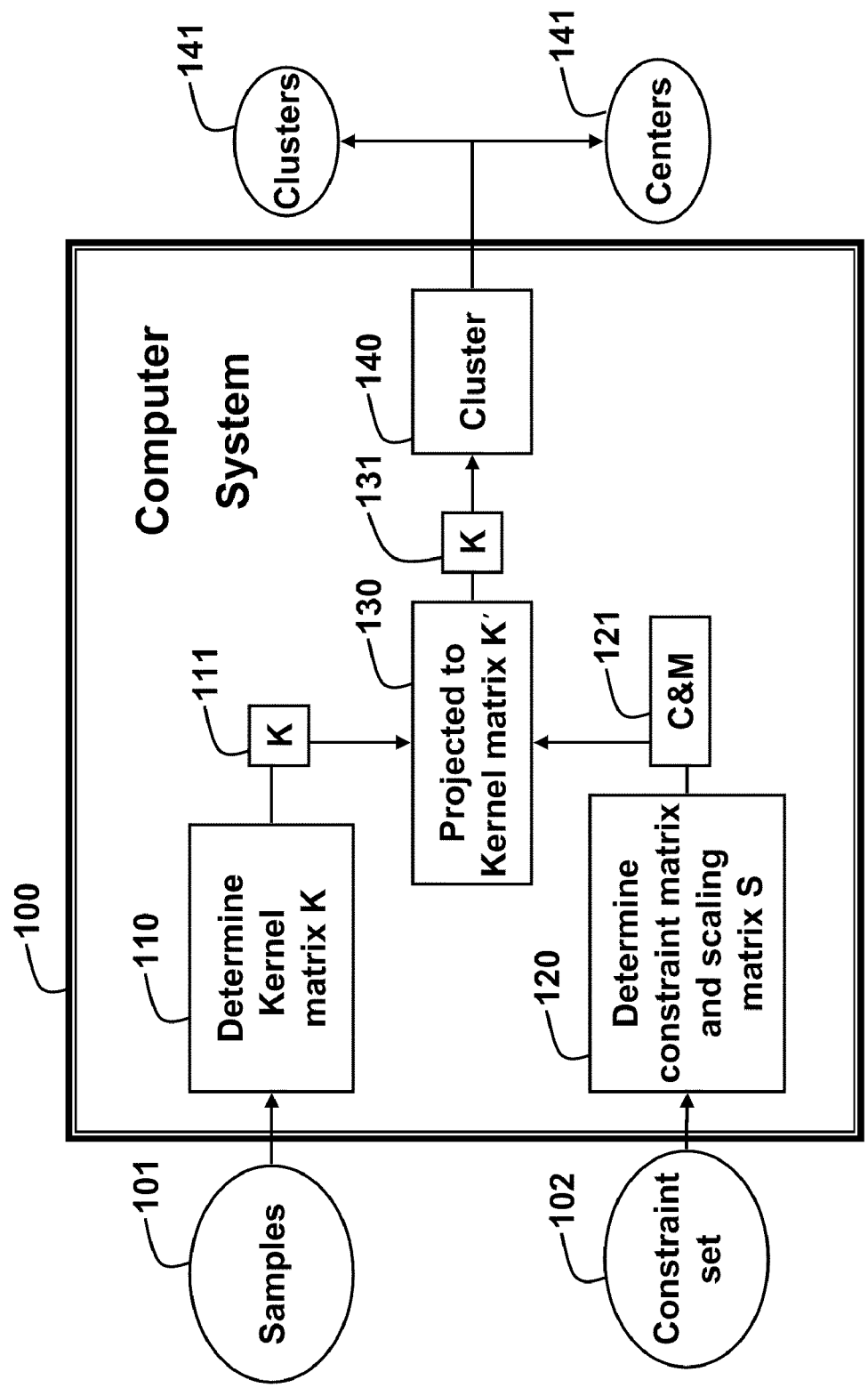
FIG. 1 is a schematic a system and method for mean shift clustering according to embodiments of our inventions.

FIG. 1 show a system and method 100 for mean shift clustering of samples according to embodiments of our inventions. The samples can be any data acquired by conventional means, e.g., by extracting features from images.

A kernel matrix K 111 is determined from samples 101 in a first dimension. A constraint matrix C and a scaling matrix S 121 are determined from a constraint set 102. The kernel matrix is projected 130 to a second dimension K' of a feature space 131, wherein the second dimension is higher than the first dimension. Then, the samples are clustered 140 into clusters 141 using the matrix K'. Cluster centers 142 can also be determined. The above steps can be performed in a computer system including a memory and input/output interfaces as known in the art.

Example of Constrained Clustering

Figure 2:
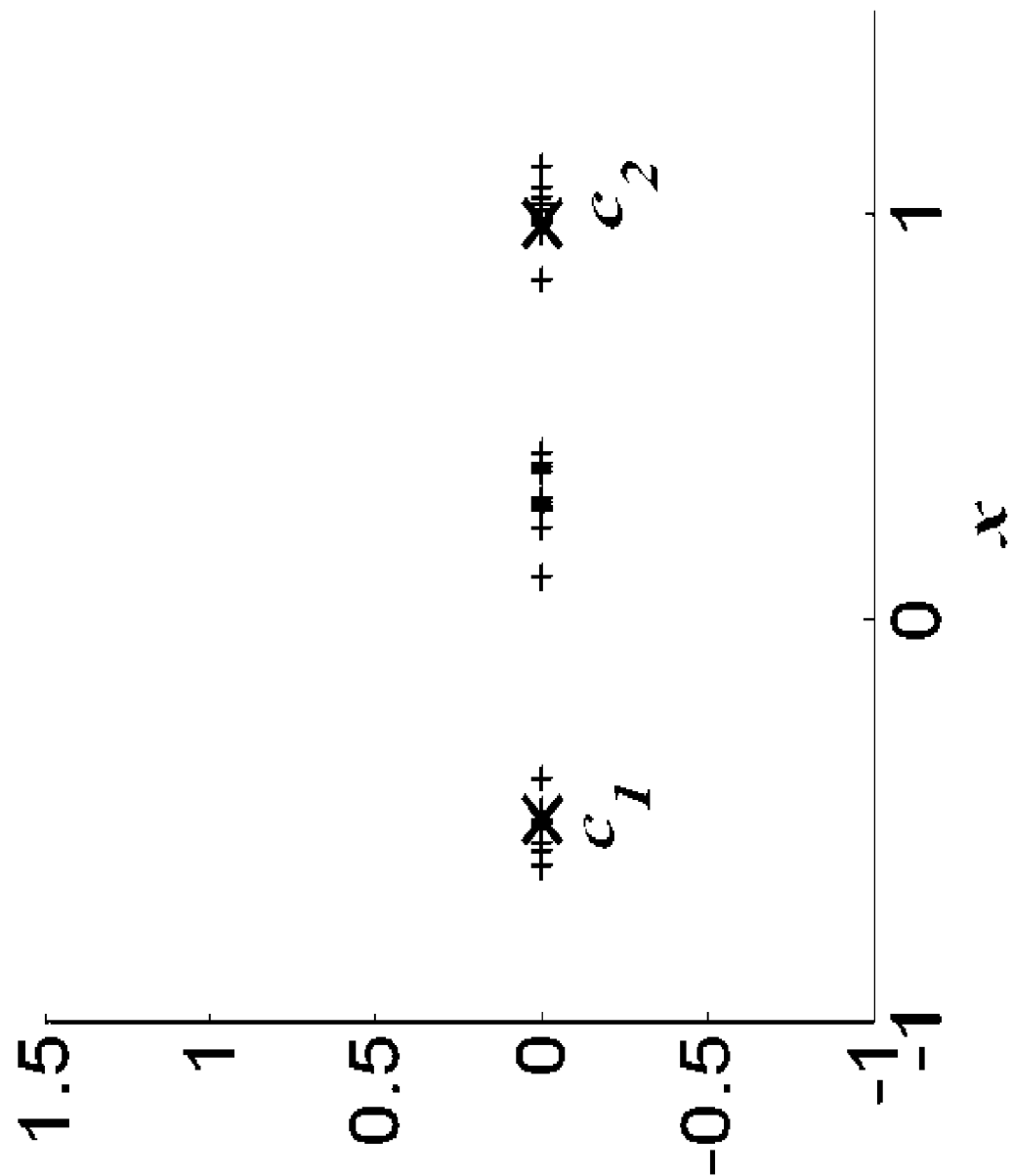
FIG. 2 is a graph of input samples according to embodiments of the invention.
Figure 3:
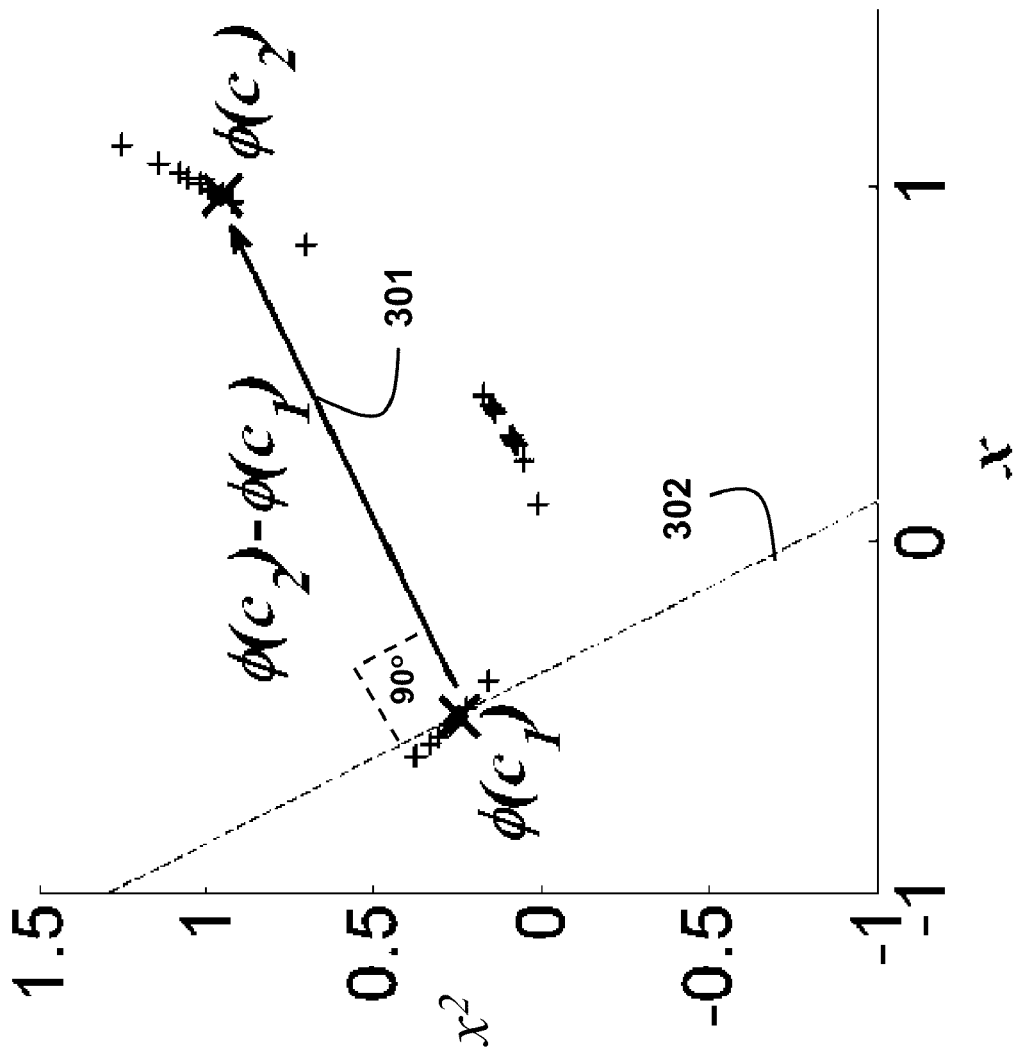
FIG. 3 is a graph of the input samples projected to a feature space according to embodiments of the invention.

FIG. 2 shows samples, (+), and a constraint sample pair (x), ($c_1$, $c_2$). FIG. 3 shows the projecting to a higher dimensional feature space using a quadratic mapping function $$\phi(x)=[x\ x^2]^T,$$

where T is the transpose operator. The arrow 301 is a constraint vector $(\phi(c_2)-\phi(c_1))^T$, and the dotted line 302 indicates a null space. The null space of the matrix K is the set of all vectors x for which Kx=0.

Figure 4:
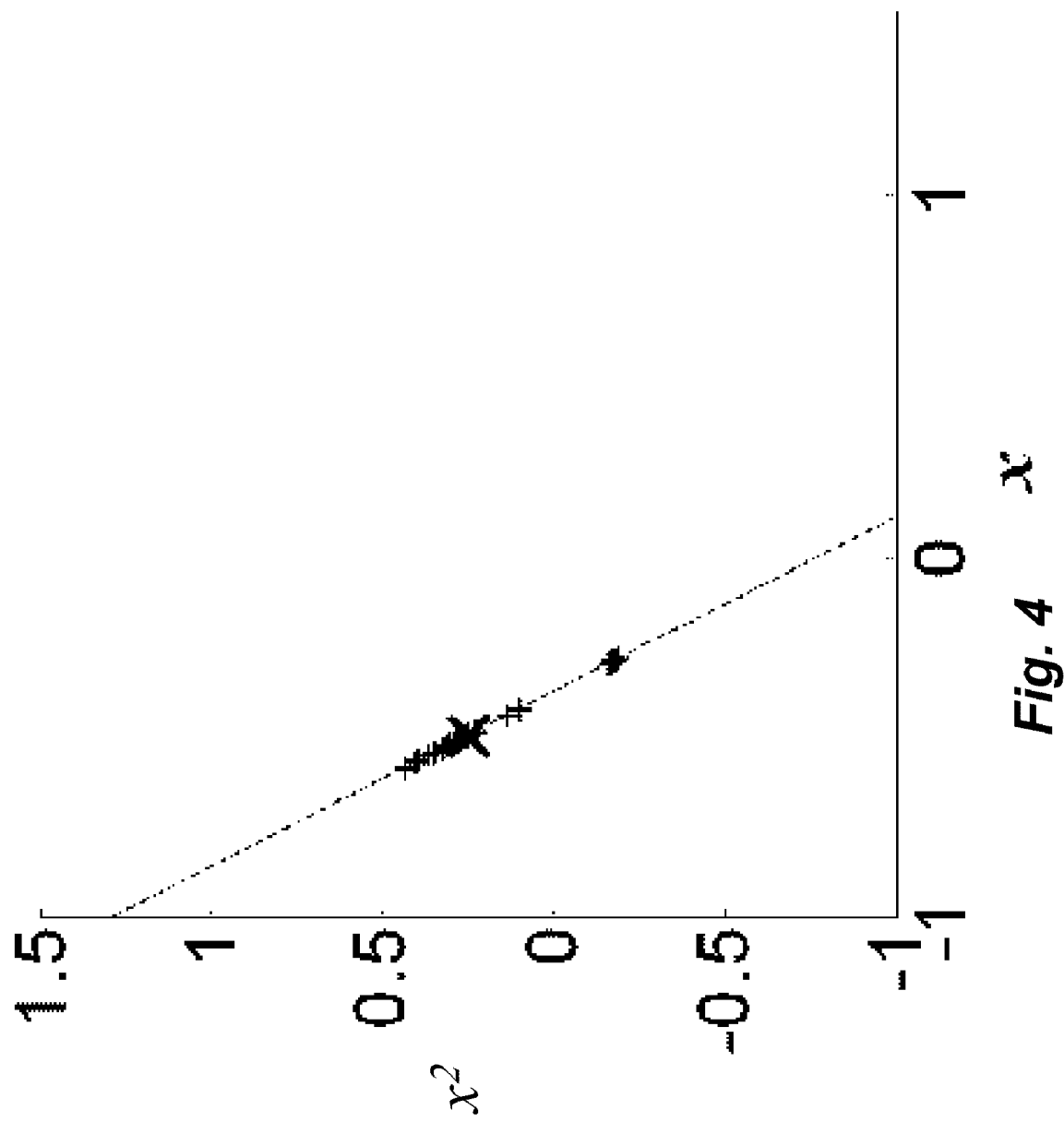
FIG. 4 is a graph of the feature space projected to a null space of a similarity constraint vector according to embodiments of the invention.

FIG. 4 shows the projection of the feature space to the null space of the constraint vector. The constrained samples are in two clusters that can easily be identified.

Motivation

The invention is motivated by the idea to enforce the set of constraints so that a similar pair of samples are in the same cluster. In addition, we modify the clusters at a local scale and carry the enforced structure to the input samples. By doing so, it is possible to guide the clustering towards the interested structure of the samples using only a small number of constraints.

Our constrained mean shift clustering is based on projecting the samples to the higher dimension than the dimension of the sample space so that the constrained pairs are associated with the same mode when the density estimation is performed in the higher dimensional feature space. In addition, we preserve the original distances between the samples during the projecting while satisfying the constraints.

We begin with the example shown in FIGS. 2-4 with a single constraint and where the clusters are linearly separable.

The sample pair $(c_1, c_2)$ is constrained. If we project the samples to the null space 302 of $(c_2-c_1)T$, which is orthogonal to the constraint vector 301, then the samples $c_1$ and $c_2$ project to the same point, and it is guaranteed that the samples are associated with the same mode. In addition, the null space projection is the optimal linear projection because it preserves the variance along the orthogonal directions to the projection direction.

However, this approach does not scale well with an increasing number of constraints. Given m linearly independent constraint vectors on a d-dimensional input space, the null space of the constraint matrix is d−m dimensional. This implies that if more than d−1 constraints are specified, all samples are in a one cluster.

Our solution projects the samples to the higher dimensional feature space using a mapping function $\phi$. Then, the same technique can used to project the samples to the null space of $(\phi(c_2)-\phi(c_1))^T$.

FIG. 2 shows the (first) one-dimensional space of the samples, which appear to be in three clusters. We incorporate the label information in terms of the pairwise constraint enforcing the two samples $c_2$ and $c_1$ to be clustered together.

As shown in FIG. 3, samples are explicitly projected to the (second) two-dimensional feature space via the quadratic mapping function $\phi(x)=[x \ x^2]^T$. This projection is an arbitrary example. As shown in FIG. 4, by projecting the input space to the null space of the constraint vector, the constrained samples points collapse to a single point, and the clustering groups the samples together.

Figure 5:
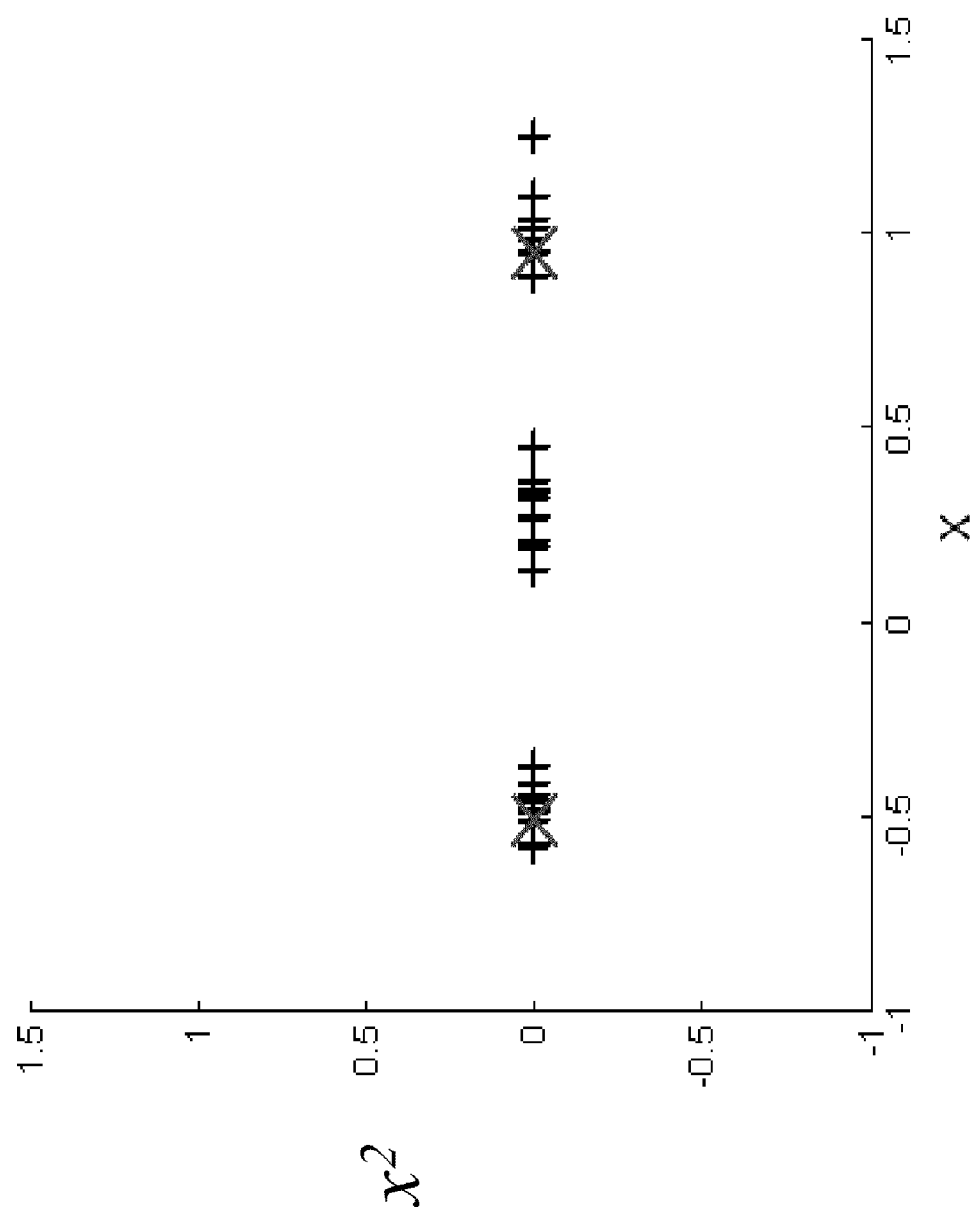
FIG. 5 is a graph of input samples according to embodiments of the invention.
Figure 6:
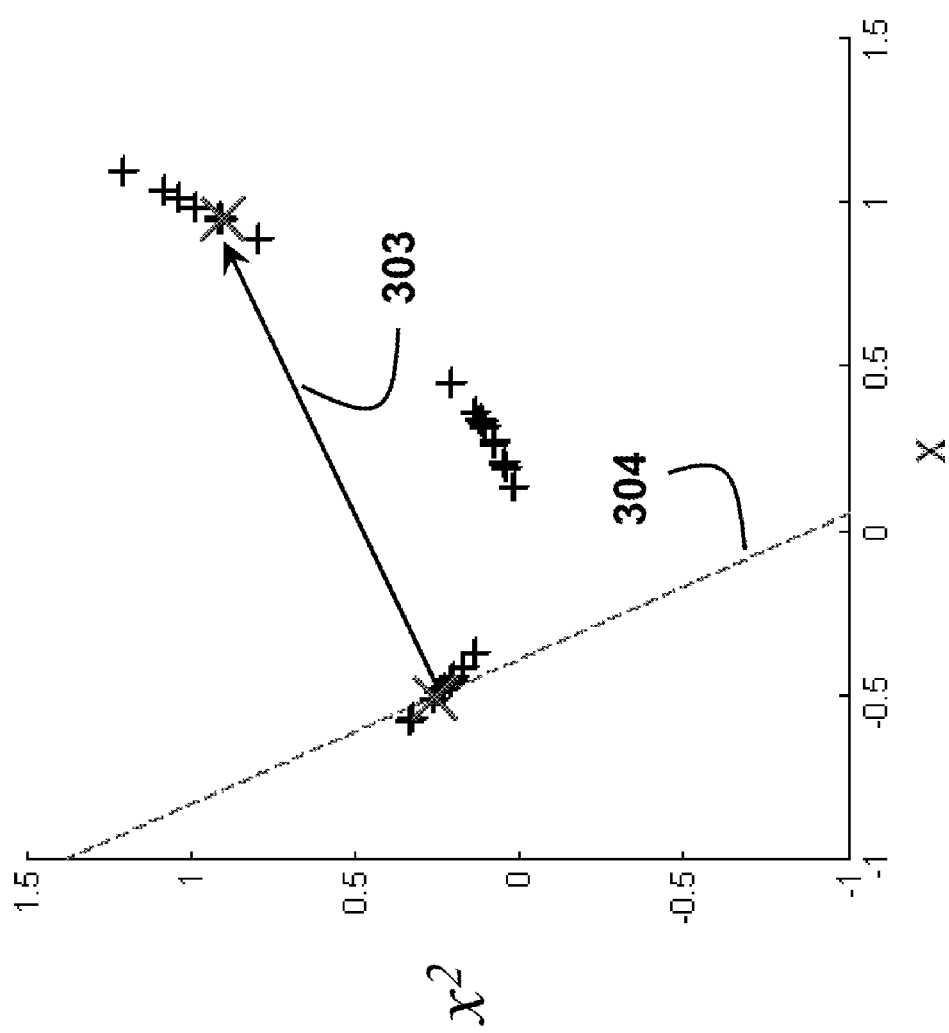
FIG. 6 is a graph of the input samples projected to a feature space according to embodiments of the invention.
Figure 7:
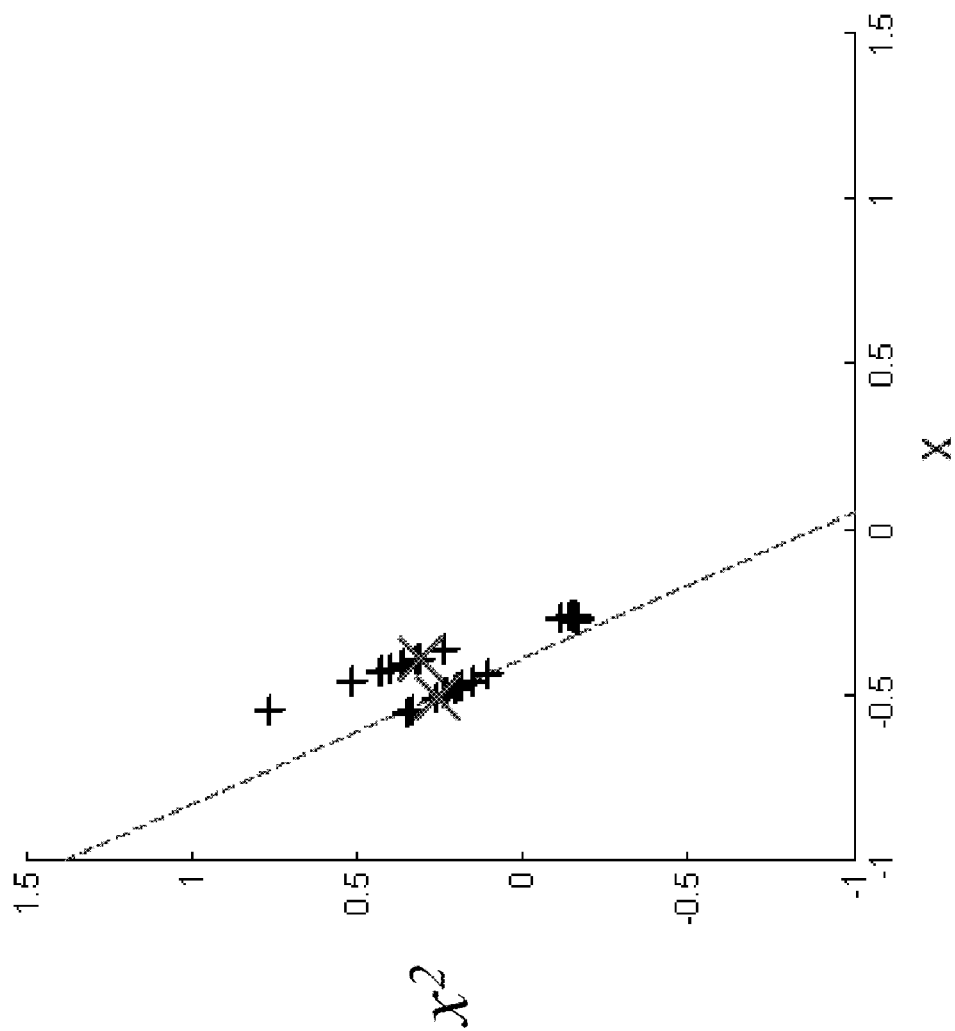
FIG. 7 is a graph of the feature space projected to a space where soft similarity constraint samples project to nearby locations according to embodiments of the invention.

In FIGS. 5-7, we show clustering with soft similarity constraints. For ease of illustration, only a single constraint is shown. However, the method is identical for multiple constraints.

In FIG. 5, the samples are in the original space. In FIG. 6, the samples are projected to the feature space with quadratic mapping. In clustering with soft similarity constraints, we scale the samples along the constraint vector direction 303, such that the constraint pair approaches each other.

FIG. 7 shows the scaling. With this scaling, the constraint samples are closer to each other in the feature space, and more likely to be clustered into the same cluster.

Figure 8:
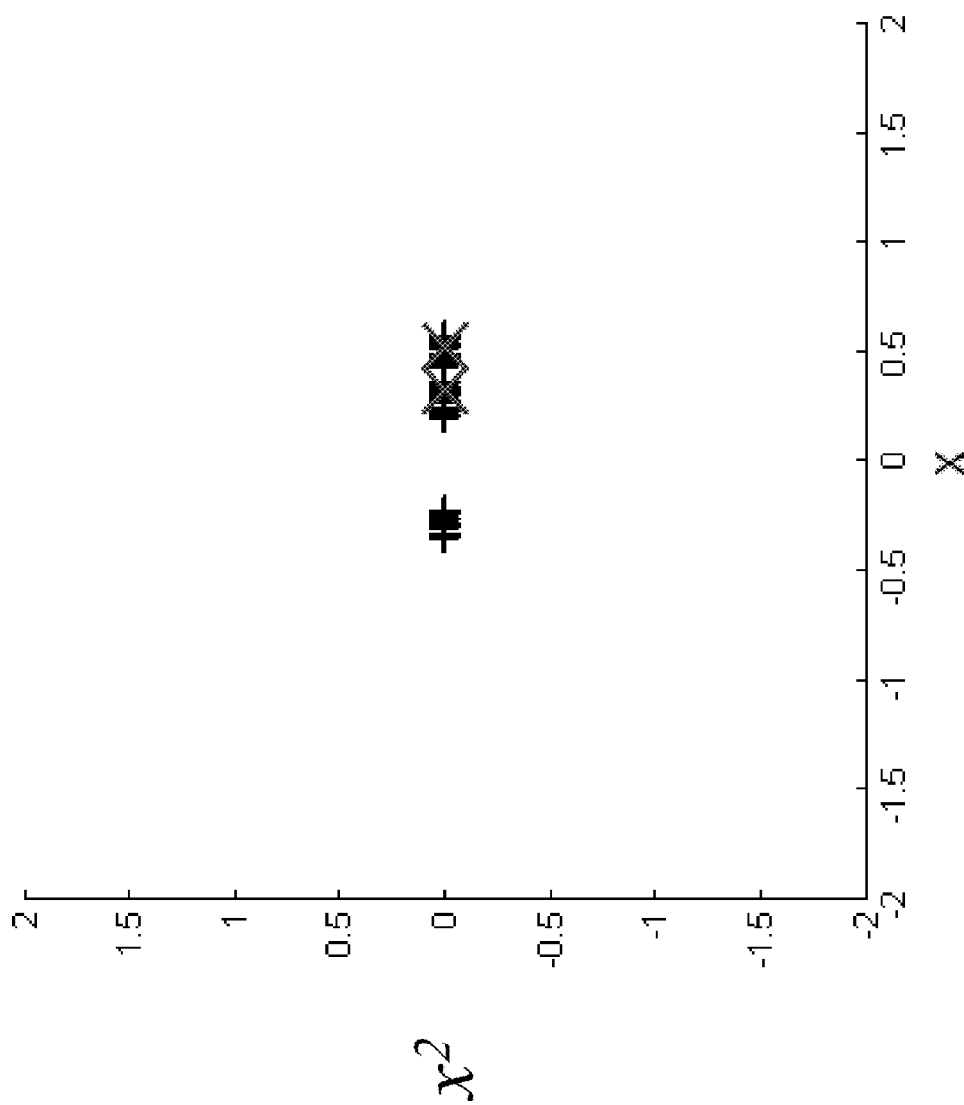
FIG. 8 is a graph of input samples according to embodiments of the invention.
Figure 9:
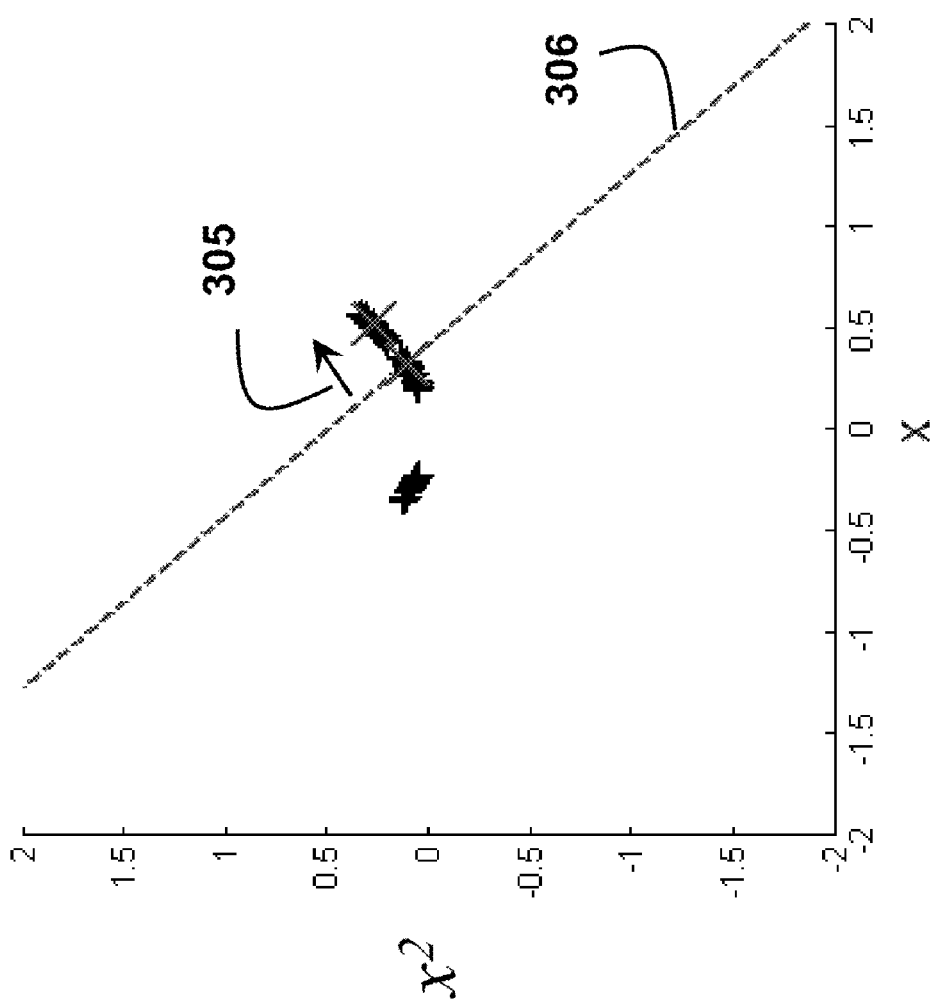
FIG. 9 is a graph of the input samples projected to a feature space according to embodiments of the invention.
Figure 10:
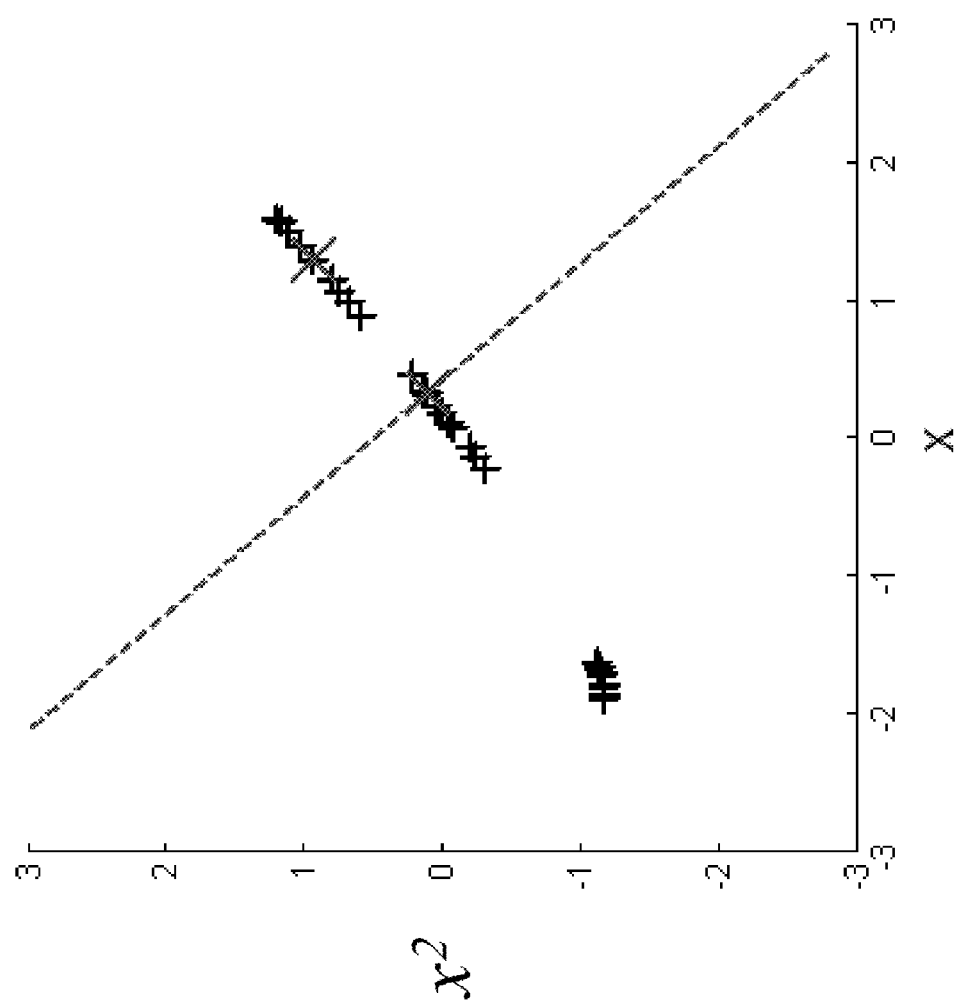
FIG. 10 is a graph of the feature space projected to a space where dissimilarity constraint samples project to distant locations according to embodiments of the invention.

FIGS. 8-10 show clustering with dissimilarity constraints. For ease of illustration, only a single constraint is shown. However, the method is identical for multiple constraints.

In FIG. 8, samples are in the original space. In FIG. 9, the samples are projected to the feature space with quadratic mapping. In clustering with dissimilarity constraints, we scale the samples points along the constraint vector direction 305, such that the constraint pair becomes distant from each other. This scaling is shown in FIG. 10. Although there appears to be two clusters in the original space of FIG. 8, three clusters are clearly visible in FIG. 10, where two constraint points are put into different clusters.

However, the explicitly projection and working in the higher dimensional space is not practical. Therefore, we provide a kernel based mean shift procedure, which implicitly works on the higher dimensional feature space, and extends the conventional Euclidean mean shift to inner product spaces. Then, the constrained mean shift on the kernel induced space reduces to modifying the kernel matrix with respect to the defined constraints.

Mean Shift Clustering

Our mean shift procedure is an extension of U.S. Pat. No. 6,590,999, "Real-time tracking of non-rigid objects using mean shift," issued to Comaniciu et al. on Jul. 8, 2003. Given n samples $x_i$ in a d-dimensional space, and associated scale (bandwidth) $h_i=h(x_i)$, $i=1,\ldots,n$, a sample density estimator for a profile $k(x)$ is $$f(x) = \frac{1}{n}\sum_{i=1}^{n} \frac{1}{h_i^d} k\left(\left\|\frac{x-x_i}{h_i}\right\|^2\right). \quad (1)$$

We use a multivariate profile $$k(x) = e^{-\frac{1}{2}x} \quad (2)$$
$$x \geq 0.$$

By taking the gradient of Equation (1), the stationary points of the density function satisfy $$\frac{2}{n}\sum_{i=1}^{n} \frac{1}{h_i^{d+2}} (x_i - x) g\left(\left\|\frac{x-x_i}{h_i}\right\|^2\right) = 0, \quad (3)$$

where $g(x)=-k'(x)$. The solution can be determined iteratively via a fixed point mean shift procedure $$a. \ \bar{x} = \frac{\sum_{i=1}^{n} \frac{x_i}{h_i^{d+2}} g\left(\left\|\frac{x-x_i}{h_i}\right\|^2\right)}{\sum_{i=1}^{n} \frac{1}{h_i^{d+2}} g\left(\left\|\frac{x-x_i}{h_i}\right\|^2\right)}. \quad (4)$$

Convergence to a local mode of the distribution is guaranteed when the mean shift iterations start at a sample.

Kernel Mean Shift

The kernel mean shift procedure forms the basis for our constrained mean shift procedure. We extend the conventional mean shift procedure from Euclidean spaces to inner product spaces. This makes it is possible to apply the procedure to a larger class of problems, such as the clustering samples that lie on arbitrary manifolds.

The set of input samples is $x_i \in X$, $i=1,\ldots,n$, not necessarily Euclidean. Let $K: X \times X$ be a positive definite kernel function satisfying, for all $x, x,$'

$$K(x,x')=\phi(x)^T\phi(x'), \quad (5)$$

where the mapping function $\phi$ projects the samples to the $d_\phi$-dimensional feature space $$H, \phi(x)=[\phi_1(x)\phi_2(x),\ldots,\phi d_\phi(x)]^T.$$

The kernel makes it possible to implicitly project the samples to the higher dimensional feature space where the nonlinear structure of samples can be observed, and the constraints can be effectively applied.

We define the mean shift procedure on the feature space H in terms of an explicit representation of the mapping function $\phi$. A sample density estimator at $y \in H$ is $$f_H(y) = \frac{1}{n}\sum_{i=1}^{n} \frac{1}{h_i^{d_\phi}} k\left(\left\|\frac{y-\phi(x_i)}{h_i}\right\|^2\right). \quad (6)$$

Taking the gradient of Equation (6) with respect to φ, the stationary points of the density function satisfy $$\frac{2}{n}\sum_{i=1}^{n}\frac{1}{h_i^{d_\phi+2}}(\phi(x_i)-y)g\left(\left\|\frac{y-\phi(x_i)}{h_i}\right\|^2\right)=0. \quad (7)$$

As for Equation (4), the solution can be found iteratively as $$\bar{y}=\frac{\sum_{i=1}^{n}\frac{\phi(x_i)}{h_i^{d_\phi+2}}g\left(\left\|\frac{y-\phi(x_i)}{h_i}\right\|^2\right)}{\sum_{i=1}^{n}\frac{1}{h_i^{d_\phi+2}}g\left(\left\|\frac{y-\phi(x_i)}{h_i}\right\|^2\right)}.$$

Now, we derive the implicit form of the procedure. The $d_\phi \times n$ matrix of the feature points is $$\Phi=[\phi(x_1)\phi(x_2)\ldots\phi(x_n)], \quad (9)$$

and the $n=n$ kernel matrix is $K=\Phi^T\Phi$, i.e., the Gram matrix, which is a symmetric matrix of the inner products. At each iteration of the mean shift procedure in Equation (8), an estimate $\bar{y}$ lies in the column space of $\Phi$. Any point on the subspace spanned by the columns of $\Phi$ can be written as $$y=\Phi\alpha_y, \quad (10)$$

where $\alpha y$ is an n-dimensional weighting vector. The distance between y and y' is $$\|y-y'\|^2 = \|\Phi\alpha_y - \Phi\alpha_{y'}\|^2 \quad (11)$$
$$= \alpha_y^T\Phi^T\Phi\alpha_y + \alpha_{y'}^T\Phi^T\Phi\alpha_{y'} - 2\alpha_y^T\Phi^T\Phi\alpha_{y'}$$
$$= \alpha_y^T K\alpha_y + \alpha_{y'}^T K\alpha_{y'} - 2\alpha_y^T K\alpha_{y'}.$$

The distances can be expressed in terms of the inner product of the samples and the method iteratively updates the weighting vector $\alpha_y$. Let $e_i$ denote the $i^{th}$ canonical basis for $\Re^n$. The kernel mean shift procedure then becomes $$\bar{\alpha}_y=\frac{\sum_{i=1}^{n}\frac{e_i}{h_i^{d_\phi+2}}g\left(\frac{\alpha_y^T K\alpha_y + e_i^T K e_i - 2\alpha_y^T K e_i}{h_i^2}\right)}{\sum_{i=1}^{n}\frac{1}{h_i^{d_\phi+2}}g\left(\frac{\alpha_y^T K\alpha_y + e_i^T K e_i - 2\alpha_y^T K e_i}{h_i^2}\right)}. \quad (12)$$

The clustering algorithm begins with the samples on the kernel space. Therefore, the initial weighing vectors are $\alpha_{y,i}=e_i$. Samples converging to the same mode are clustered.

The rank of the kernel matrix K is smaller than n, and the columns of $\Phi$ form an overcomplete basis. Therefore, the modes can be identified within an equivalence relationship where two modes are considered same when the distance on the feature space is zero. In addition, it is possible that the mode can not be represented on the input space X because the mapping function φ is not necessarily invertible.

Constrained Mean Shift Clustering Procedure

The set of m constrained samples is $\{(c_{j,1}, c_{j,2})\}$. Initially, we project the samples to the feature space via the mapping function φ, and the constraints are satisfied by projecting the feature space to the null space of the constraint vectors. Let A be the $m \times d_\phi$ dimensional constraint matrix $$A = \begin{pmatrix} (\phi(c_{1,1})-\phi(c_{1,2}))^T \\ \vdots \\ (\phi(c_{m,1})-\phi(c_{m,2}))^T \end{pmatrix}. \quad (13)$$

Given the samples and the constraint set, the constrained mean shift procedure projects the samples to the null space of the constraint matrix $$\phi(x)=P\phi(x) \quad (14)$$

where P is the projection matrix $$P=L_{d_\phi}-A^T(AA^T)^+A, \quad (15)$$

and implicitly perform the mean shift on the feature space. Because the constrained samples project to the same feature point, the samples converge to the same mode. Instead of rewriting the mean shift procedure on the feature space, it suffices to modify the kernel matrix K with respect to the projection, and apply the derived kernel mean shift procedure on the modified kernel matrix. The equivalence follows from the fact that apart from the distance computations, the procedure is identical and the distances only involve feature points in terms of the inner products. The projected kernel matrix is given by $$K(x,x')-K(\phi(x),A)^T S^+ K(\phi(x'),A), \quad (16)$$

where $$S_{i,j} = K(c_{i,1}, c_{j,1}) - K(c_{i,1}, c_{j,2}) - K(c_{i,2}, c_{j,1}) + K(c_{i,2}, c_{j,2}) \quad (17)$$

is the scaling matrix.

Instead of samples, it is sufficient to supply only the kernel matrix K 110 and the constraints 121 to our weakly supervised kernel mean shift procedure.

To reduce memory requirements, the kernel matrix K can be approximated by a low rank decomposition of the kernel matrix using an incremental singular value decomposition (SVD).

The "cannot-link" constraints can be applied in the same framework. The samples are scaled along the constraint vector directions such that the constraint pair becomes distant from each other. First, the samples are projected to the null space of the constraint vector according to Equation (14). Then, a scalar multiple of the constraint directions are added to the samples.

Let $$A = \begin{pmatrix} (\phi(c_{1,1})-\phi(c_{1,2}))^T \\ \vdots \\ (\phi(c_{m,1})-\phi(c_{m,2}))^T \end{pmatrix} \quad (18)$$

be the normalized constraint vectors. The scaling along each constraint direction is defined by $$s(\phi(x)) = \begin{pmatrix} \lambda_1 \frac{(\phi(c_{1,1}) - \phi(c_{1,2}))^T}{\|\phi(c_{1,1}) - \phi(c_{1,2})\|} (\phi(x) - \phi(c_{1,2})) \\ \vdots \\ \lambda_m \frac{(\phi(c_{m,1}) - \phi(c_{m,2}))^T}{\|\phi(c_{m,1}) - \phi(c_{m,2})\|} (\phi(x) - \phi(c_{m,2})) \end{pmatrix} \quad (19)$$

where $\lambda_1, \ldots, \lambda_m$ control how much scaling is performed along each direction. The scaled projections are $$\hat{\phi}(x) = P\phi(x) + s(\phi(x))^T \overline{A}. \quad (20)$$

Setting $\lambda_i$ greater than 1 in Equation (19) scales the samples such that the constraint samples become distant from each other. By setting $\lambda_i$ to larger values and using the kernel mean shift procedure, the constraint samples are grouped into different clusters, as shown in FIGS. 8-10.

The soft constraints can also be applied in the same framework. The samples are scaled along the constraint vector directions such that the constraint pair becomes closer to each other. This is achieved by setting $\lambda_i$ less than 1 in Equation (19). The constraint samples are projected to nearby points, not necessarily to the same point. Hence, the constrained samples are used as a guide, but not necessarily grouped into the same cluster as shown in FIGS. 5-7. Setting $\lambda_i$ equal to 0 is equivalent to the hard constraint algorithm described above.

The method extends the mean shift clustering to any inner product space and any arbitrary distance function satisfying a metric axioms.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for clustering samples using a mean shift procedure, comprising the a computer system for performing steps of the method, comprising the steps of:

determining a kernel matrix from the samples in a first one-dimensional space;

determining a constraint matrix and a scaling matrix from a constraint set;

projecting the kernel matrix to a two-dimensional feature space using the constraint matrix;

clustering the samples using the mean shift procedure and soft similarity constraints according to the kernel matrix.

2. The method of claim 1, further comprising:

determining a center of each cluster.

3. The method of claim 1, wherein the constraint set specifies pairs of samples to be clustered into the same cluster.

4. The method of claim 1, wherein the constraint set specifies pairs of samples to be clustered into different clusters.

5. The method of claim 1, wherein the projecting is explicitly defined with a mapping function $\phi$ of the samples.

6. The method of claim 1, wherein the kernel function is a symmetric matrix of inner products and the projecting is implicit.

7. The method of claim 1, wherein the projecting is orthogonal to the constraint vectors in the feature space.

8. The method of claim 1, wherein the projecting scales the samples along the constraint vectors in the feature space.

9. The method of claim 1, wherein the projecting preserves distances between the samples while satisfying the constraint set.

10. The method of 1, wherein the samples lie on arbitrary manifolds.

11. The method of claim 1, wherein the kernel matrix approximated by a low rank decomposition of the kernel matrix.

12. The method of claim 1, wherein the projecting operates directly on the kernel matrix according to the constraint matrix.

13. The method of claim 1, wherein the clustering uses an arbitrary distance metric.

14. The method of claim 1, wherein the clustering uses soft dissimilarity constraints.

* * * * *